United States Patent Office 2,833,833
Patented May 6, 1958

2,833,833

PREPARATION OF POLYALKYLATED BENZENES FROM KETONES

Louis Schmerling, Riverside, Ill., assignor to Universal Oil Products Company, Des Plaines, Ill., a corporation of Delaware No Drawing. Application February 15, 1955
Serial No. 488,425

9 Claims. (Cl. 260—668)

This invention relates to a process for preparing polyalkylated benzenes, and more particularly to a process for preparing mesitylene.

An object of this invention is to prepare polyalkylated benzenes by reacting a ketone.

A further object of this invention is to prepare polyalkylated benzenes by reacting a ketone in the presence of a catalyst comprising a metallic oxide and combined halogen.

A still further object of this invention is to prepare polyalkylated benzenes by reacting a ketone containing at least one hydrogen atom on a carbon atom alpha to the carbonyl grouping in the presence of a catalyst comprising a metallic oxide and combined halogen.

One embodiment of this invention resides in a process for preparing a polyalkylated benzene by reacting a ketone having the formula:

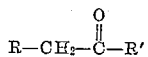

in which R is selected from the group consisting of hydrogen, alkyl and aryl radicals and R' is selected from the group consisting of alkyl and aryl radicals in the presence of a metallic oxide and combined halogen catalyst, and recovering the resultant polyalkylated benzene.

A specific embodiment of the invention resides in a process for preparing a polyalkylated benzene by reacting a ketone having the formula:

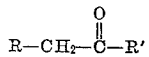

in which R is selected from the group consisting of hydrogen, alkyl and aryl radicals and R' is selected from the group consisting of alkyl and aryl radicals in the presence of a metallic oxide and combined halogen catalyst at a temperature in the range of from about 300° to about 500° C., and recovering the resultant polyalkylated benzene.

Another specific embodiment of the invention resides in a process for preparing a polyalkylated benzene by reacting a ketone having the formula:

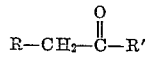

in which R is selected from the group consisting of hydrogen, alkyl and aryl radicals and R' is selected from the group consisting of alkyl and aryl radicals in the presence of a combined hydrogen halide and alumina composited with platinum at a temperature in the range of from about 375° to about 450° C., and recovering the resultant polyalkylated benzene.

A more specific embodiment of the invention resides in a process for preparing 1,3,5-trimethylbenzene which comprises reacting acetone in the presence of a combined hydrogen halide and alumina composited with platinum at a temperature in the range of from about 375° to about 450° C., and recovering the resultant 1,3,5-trimethylbenzene.

Other objects and embodiments referring to alternative catalysts and to alternative ketones will be found in the following further detailed description of this invention.

Polyalkylated benzenes such as 1,3,5-trimethylbenzene, commonly known as mesitylene, find many uses in the chemical industry. One of the best known uses for such products is that as a solvent for aromatic hydrocarbons, alcohols, esters and ethers, oils, gums, resins, lacquers, etc.

These polyalkylated benzenes may be prepared by reacting a ketone in the presence of a metallic oxide such as alumina, silica, zirconia, thoria combined with a halogen. The inorganic metallic oxide catalysts may be prepared by treating the oxide with an acidic substance, hydrogen chloride, hydrogen bromide, and/or hydrogen fluoride. Other acids may be combined with the metallic oxide supports, although not necessarily with equivalent results. In addition, if so desired, the metallic oxide combined with halogen may be composited with a metal having hydrogenation-dehydrogenation activity. Included in these metals are the metals of group VIII of the periodic table including platinum, palladium, osmium, iridium, rubidium, ruthenium, iron, cobalt and nickel.

A preferred type of catalyst used in the process of this invention comprises platinum-alumina-combined halogen. These catalysts may contain substantial amounts of platinum, but, for economic as well as for product yield and quality reasons, the platinum content usually will be within the range of from about 0.05%–1.5%. These catalysts also contain relatively minor amounts of halogen, especially fluorine and chlorine. On a dry alumina basis, the halogen content usually will be within the range of from about 0.1% to about 3%. The precise manner in which the halogen is present in the catalyst is not known, but it is believed to be combined with one or more of the other constituents. Consequently, it is often referred to as combined halogen.

One method of preparing catalysts used in our process comprises adding a suitable alkaline reagent such as ammonium hydroxide or carbonate to a salt of aluminum such as aluminum chloride, aluminum sulfate, aluminum nitrate and the like in an amount sufficient to form aluminum hydroxides, which, upon drying, are converted to alumina. The halogen may be added to the resultant slurry in the form of an acid such as hydrogen chloride or hydrogen fluoride or as a volatile salt such as ammonium fluoride or ammonium chloride. Platinum or one of the other metals of group VIII of the periodic table may be added to the alumina by adding hydrogen sulfide to chloroplatinic acid solutions, for example, commingling the resultant solution with the halogen-containing alumina, and thereafter heating the resultant composite to a temperature of from about 800° F. to about 1200° F. In general, the platinum-alumina-combined halogen catalysts that are used contain about 0.05–1.5% platinum and about 0.1%–3.0% combined fluorine and/or combined chlorine.

Suitable ketones which may be used in the process of this invention comprise those ketones which contain at least one hydrogen atom on a carbon atom alpha to the carbonyl grouping. Such ketones have the formula:

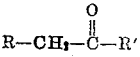

in which R comprises either hydrogen, alkyl or aryl radicals and R' may comprise either an alkyl or aryl radical. The preferred ketones of this invention comprise those in which R consists of a hydrogen radical. Ketones which may be used include acetone, methyl ethyl ketone, methyl propyl ketone, methyl butyl ketone, diethyl ketone, ethyl propyl ketone, ethyl butyl ketone, dipropyl ketone, propyl butyl ketone, diisopropyl ketone, isopropyl butyl ketone, dibutyl ketone, diisobutyl ketone, etc., acetophenone, ethyl phenyl ketone, propyl phenyl ketone, butyl phenyl ketone, isopropyl phenyl ketone, etc., benzyl phenyl ketone, etc.

When acetone is treated in the process of the present invention, the polyalkylated benzene which is formed is 1,3,5-trimethylbenzene (mesitylene). The chief product obtained from methyl ethyl ketone is 1,3,5-triethylbenzene; from acetophenone, 1,3,5-triphenylbenzene.

The reaction of this invention is usually carried out at a temperature in the range of from about 300° to about 500° C. or more, the preferred range being from about 375° to about 450° C. Generally speaking, pressures ranging from about atmospheric to about 100 atmospheres or more are used, the superatmospheric pressures being either autogenous pressures or those obtained by the use of an inert gas such as nitrogen. In addition, the reaction may be carried out in the presence of hydrogen in place of the inert gas, although said hydrogen is not absolutely necessary in order that the reaction proceeds.

The process of the present invention may be effected in any suitable manner and may comprise either a batch or continuous type operation. When a batch type operation is used, a quantity of the ketone and the catalyst is placed in an appropriate reaction vessel, for example, an autoclave equipped with heating and mixing means. The autoclave is then sealed and heated to the desired temperature, that is, a temperature in the range of from about 300° to about 500° C., or more. In addition, an inert gas such as nitrogen may be pressed in to put the reactants at a superatmospheric pressure. Alternatively, as hereinbefore mentioned, hydrogen may be used in place of the inert gas. At the end of the desired residence time, the reaction vessel and contents thereof is cooled to room temperature and the desired polyalkylated benzene is separated from the unreacted starting material and catalyst by fractional distillation, crystallization, etc.

Another process in which the ketone may be reacted to form a polyalkylated benzene comprises a continuous type of operation. In this type of operation the ketone is continuously introduced to a reaction vessel which is maintained at the proper operating conditions of temperature and pressure. The reaction vessel may comprise an unlined tube or coil or it may be lined with an adsorbent packing material such as alumina, fire brick, dehydrated bauxite, and the like. The particular catalyst used in the reaction may be present as a fixed bed or it may be employed as a fluid bed or in a slurry-type process. At the end of the desired residence time, the polyalkylated benzene is continuously withdrawn from the reactor and separated from unreacted starting material and catalyst, if any, by conventional means hereinbefore set forth, while said unreacted starting material may be recycled to form a portion of the feed stock.

The following examples are given to illustrate the process of the present invention which, however, are not intended to limit the generally broad scope of said invention in strict accordance therewith.

Example I 90 g. of acetone and 15 g. of a catalyst comprising alumina and combined with minor amounts of hydrogen chloride and hydrogen fluoride were placed in a glass liner of an autoclave. The liner was sealed into a rotating autoclave and nitrogen gas was pressed in until a pressure of approximately 30 atmospheres was reached. The autoclave was then heated to a temperature of approximately 400° C. for a period of four hours. At the end of this time the autoclave and contents thereof was cooled to room temperature and the reaction product subjected to fractional distillation. The cut boiling from 164° to 165° C., comprising 1,3,5-trimethylbenzene (mesitylene) was separated out, the amount of this cut being 10 g. (16% yield).

Example II 90 g. of acetone and 15 g. of a catalyst comprising alumina impregnated with hydrogen chloride and fluoride and composited with platinum were placed into a glass liner, said liner being then sealed in a rotating autoclave. 30 atmospheres of nitrogen was pressed in and the autoclave was heated to a temperature of approximately 400° C. for four hours. At the end of this time, the autoclave was cooled to room temperature and the contents thereof subjected to fractional distillation. A cut boiling at 164° to 165° C. was separated, a 19% yield of mesitylene being obtained therefrom.

Example III

The experiment described in Example II above was repeated, the only difference being that the autoclave was heated to a temperature of 425° C. Upon completion of the residence time, the contents were subjected to fractional distillation and an 18% yield of mesitylene was obtained therefrom.

Example IV

To show the advantage of using a catalyst impregnated with an acidic substance, 90 g. of acetone and 15 g. of a neutral alumina were placed in the glass liner in a rotating autoclave. The autoclave was sealed, 30 atmospheres of nitrogen was added, and the autoclave was heated to a temperature of approximately 400° C. for four hours. At the end of this time, the autoclave was cooled and the reaction product subjected to fractional distillation. The yield of mesitylene in this experiment amounted to only 10%.

I claim as my invention:

1. A process for the preparation of a polyalkylated benzene which comprises reacting a ketone having the formula:

in which R is selected from the group consisting of hydrogen, alkyl and aryl radicals and R' is selected from the group consisting of alkyl and aryl radicals in the presence of a metallic oxide combined with halogen and composited with platinum, and recovering the resultant polyalkylated benzene.

2. A process for the preparation of a polyalkylated benzene which comprises reacting a ketone having the formula:

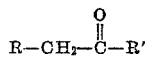

in which R is selected from the group consisting of hydrogen, alkyl and aryl radicals and R' is selected from the group consisting of alkyl and aryl radicals in the presence of a metallic oxide combined with halogen and composited with platinum at a temperature in the range of from about 300° to about 500° C., and recovering the resultant polyalkylated benzene.

3. A process for the preparation of a polyalkylated benzene which comprises reacting a ketone having the formula:

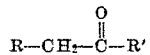

in which R is selected from the group consisting of hydrogen, alkyl and aryl radicals and R' is selected from the group consisting of alkyl and aryl radicals in the presence of a metallic oxide combined with halogen and composited with platinum at a temperature in the range of from about 375° to about 450° C., and recovering the resultant polyalkylated benzene.

4. A process for the preparation of a polyalkylated benzene which comprises reacting a ketone having the formula

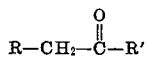

in which R is selected from the group consisting of hydrogen, akyl and aryl radicals and R' is selected from the group consisting of alkyl and aryl radicals in the presence of an alumina combined with hydrogen chloride and composited with platinum at a temperature in the range of from about 375° to about 450° C., and recovering the resultant polyalkylated benzene.

5. A process for the preparation of a polyalkylated benzene which comprises reacting a ketone having the formula

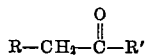

in which R is selected from the group consisting of hydrogen, akyl and aryl radicals and R' is selected from the group consisting of alkyl and aryl radicals in the presence of an alumina combined with hydrogen fluoride and composited with platinum at a temperature in the range of from about 375° to about 450° C., and recovering the resultant polyalkylated benzene.

6. A process for the preparation of a polyalkylated benzene which comprises reacting a ketone having the formula

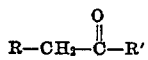

in which R is selected from the group consisting of hydrogen, akyl and aryl radicals and R' is selected from the group consisting of alkyl and aryl radicals in the presence of alumina combined with hydrogen halide and composited with platinum at a temperature in the range of from about 375° to about 450° C., and recovering the resultant polyalkylated benzene.

7. A process for the preparation of 1,3,5-trimethylbenzene which comprises reacting acetone in the presence of a catalyst comprising alumina combined with halogen and platinum at a temperature in the range of from about 375° to about 450° C., and recovering the resultant 1,3,5-trimethylbenzene.

8. A process for the preparation of 1,3,5-triethylbenzene which comprises reacting methyl ethyl ketone in the presence of a catalyst comprising alumina combined with halogen and platinum at a temperature in the range of from about 375° to about 450° C., and recovering the resultant 1,3,5-triethylbenzene.

9. A process for the preparation of 1,3,5-triphenylbenzene which comprises reacting acetophenone in the presence of a catalyst comprising alumina combined with halogen and platinum at a temperature in the range of from about 375° to about 450° C., and recovering the resultant 1,3,5-triphenylbenzene.

References Cited in the file of this patent

UNITED STATES PATENTS

| | | |
|---|---|---|
| 2,429,361 | Linn et al. | Oct. 21, 1947 |
| 2,431,754 | Ipatieff et al. | Dec. 2, 1947 |
| 2,479,110 | Haensel | Aug. 16, 1949 |
| 2,542,488 | Dinwiddie | Feb. 20, 1951 |

OTHER REFERENCES

Faraday: Encyclopedia of Hydrocarbon Compounds, vol. C9, 1950, pp. 09028.00.14 to 09028.00.15.